United States Patent
Shimizu

(10) Patent No.: US 6,715,008 B2
(45) Date of Patent: *Mar. 30, 2004

(54) METHOD AND SYSTEM FOR OVER-RUN PROTECTION IN A MESSAGE PASSING MULTI-PROCESSOR COMPUTER SYSTEM USING A CREDIT-BASED PROTOCOL

(75) Inventor: Takeshi Shimizu, San Jose, CA (US)

(73) Assignee: Fujitsu Ltd., Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,650

(22) Filed: Apr. 7, 1999

(65) Prior Publication Data

US 2002/0178306 A1 Nov. 28, 2002

Related U.S. Application Data

(60) Provisional application No. 60/084,795, filed on May 8, 1998.

(51) Int. Cl.$^7$ ................................................ G06F 3/02
(52) U.S. Cl. ............................ 710/56; 710/17; 710/37
(58) Field of Search ............................ 710/37, 56, 42, 710/17, 19, 29, 34, 52; 709/229, 234, 235, 240, 248, 201, 206, 207, 215

(56) References Cited

U.S. PATENT DOCUMENTS 5,748,629 A * 5/1998 Caldara et al. ............. 370/389
5,867,663 A * 2/1999 McClure et al. ........ 395/200.64
6,209,064 B1 * 3/2001 Weber ......................... 711/100
6,246,684 B1 * 6/2001 Chapman et al. ............ 370/394
6,246,687 B1 * 6/2001 Siu ............................. 370/395

OTHER PUBLICATIONS

Wolf–Dietrich Weber, et al., "The Mercury Interconnect Architecture: A Cost–effective Infrastructure for High–performance Servers", In proceedings of the 24th International Symposium on Computer Architecture (ISCA '97), pp 22–30, Jun. 1997.

http://www.webopedia.com/TERM/o/octet.html, Octet (last visited Jan. 24, 2002).

http://www.webopedia.com/TERM/cell.html, Cell (last visited Jan. 24, 2002).

Douglas E. Comer, Internetworking With TCP/IP VOI I: Principles, Protocols, and Architecture, Third Edition, p. 36, 308, Prentice Hall, Upper Saddle River, New Jersey.

* cited by examiner

Primary Examiner—Ilwoo Park
Assistant Examiner—Harold Kim
(74) Attorney, Agent, or Firm—Carr & Ferrell LLP

(57) ABSTRACT

In a multi-processor computer system, a message receive unit using a shared buffer pool and a set of per-node credit registers in each processor node. The buffer stores incoming messages received from the sending nodes. The credit registers prevent a sending node from using more than its allocated share of the buffer pool and thus prevent the buffer pool from overflowing. Because the buffer pool of the receiving node does not overflow, the receiving node can continue to communicate with other nodes.

20 Claims, 5 Drawing Sheets

METHOD AND SYSTEM FOR OVER-RUN PROTECTION IN A MESSAGE PASSING MULTI-PROCESSOR COMPUTER SYSTEM USING A CREDIT-BASED PROTOCOL

This application claims the benefit of U.S. Provisional Application No. 60/084,795, filed on May 8, 1998.

CROSS-REFERENCE TO CO-PENDING APPLICATIONS

This application is related to co-pending U.S. patent application Ser. No. 09/041,568, entitled "Cache Coherence Unit for Interconnecting Multiprocessor Nodes Having Pipelined Snoopy Protocol," filed on Mar. 12, 1998; co-pending U.S. patent application Ser. No. 09/003,771, entitled "Memory Protection Mechanism for a Distributed Shared Memory Multiprocessor with Integrated Message Passing Support," filed on Jan. 7, 1998; co-pending U.S. patent application Ser. No. 09/003,721, entitled "Cache Coherence Unit with Integrated Message Passing and Memory Protection for a Distributed, Shared Memory Multiprocessor System," filed on Jan. 7, 1998; co-pending U.S. patent application Ser. No. Unknown, entitled "Split Sparse Directory for a Distributed Shared Memory Multiprocessor System," filed on Mar. 30, 1999; and co-pending U.S. patent application Ser. No. Unknown, entitled "Computer Architecture for Avoiding Deadlock in Network Communications," filed on Apr. 2, 1999, which are hereby incorporated by reference.

BACKGROUND OF THE INVENTION

1. Field of the Invention

The present invention relates generally to computer communication protocols, and more specifically to a credit-based message protocol in a multi-processor computer system.

2. Discussion of Background Art

Multi-processor computer systems are made up of multiple processor nodes communicating over a high-speed interconnection network. Each processor node typically includes a processor and local Random Access Memory (RAM). Computational tasks are divided among processor nodes to maximize utilization of resources available at different processor nodes. Dividing a task among processor nodes can reduce the time needed to produce a result, but implies that one part of a task being processed by one node may depend on the results of another part of the tasked being processed by another processor node. The various sub-tasks must exchange information relevant to their processing, and synchronize their processing, via the network.

Different methods of communication exist. The shared-memory method of communication is very fast because each processor can simply read what has been written by other processors. However, in this method the critical memory areas used for communications by one sub-task are not protected from being overwritten by another sub-task. In a message-passing model, on the other hand, each processor can only access its own memory and can only communicate with other processors by explicitly composing a message and sending it to other processors. This model protects communications because one processor cannot write to another processor's memory.

In either of these methods of communication, when a first processor node sends a message to a second processor node, the first node waits for an acknowledgement from the second node. When the message reaches the second node, there are three possibilities: the message is accepted, the message is lost, or the message is blocked. If the receiving processor node is too busy or too full to process the message, the message may be lost. The receiving processor may return a message indicating the loss of the message or it may remain silent. If the message is blocked, then the communication interface clogs the system and clogging propagates backward, congesting the network and/or harming the system.

An efficient way to receive messages allows incoming messages to be written to a receiving node memory buffer that is shared between all senders that may communicate with the receiver. If any particular sender continually sends messages to the receiver, for example, due to a software or hardware error in the sender, that sender can over-run the receiver and fill up the shared buffer. Then, additional incoming messages may be discarded or blocked in the network. In either case, the flood of erroneous messages would interfere with the processing of legitimate messages from other nodes.

What is needed, therefore, is a message passing system that overcomes the above-discussed deficiencies.

SUMMARY OF THE INVENTION

The present invention provides a credit-based mechanism to limit the maximum number of packets a node can receive from another node in a multi-processor node computer system. The invention includes a buffer pool and a credit mechanism in each node wherein the buffer temporarily stores incoming packets sent by other nodes. The credit mechanism allocates a predetermined number of packets which a node can receive from another node so that no sending node can use more than its allocated share of the buffer pool, and thus assures that the buffer pool will not overflow. Even though a node can continue to transmit unwelcome packets, the packets are not written into the packet buffer pool, and are thus discarded. Because the packet buffer does not overflow, the receiving node can continue to communicate with other nodes.

DETAILED DESCRIPTION OF THE PREFERRED EMBODIMENT

The present invention provides a credit-based mechanism to limit the number of packets a node can receive from another node in a multi-processor node computer system.

Figure 1:
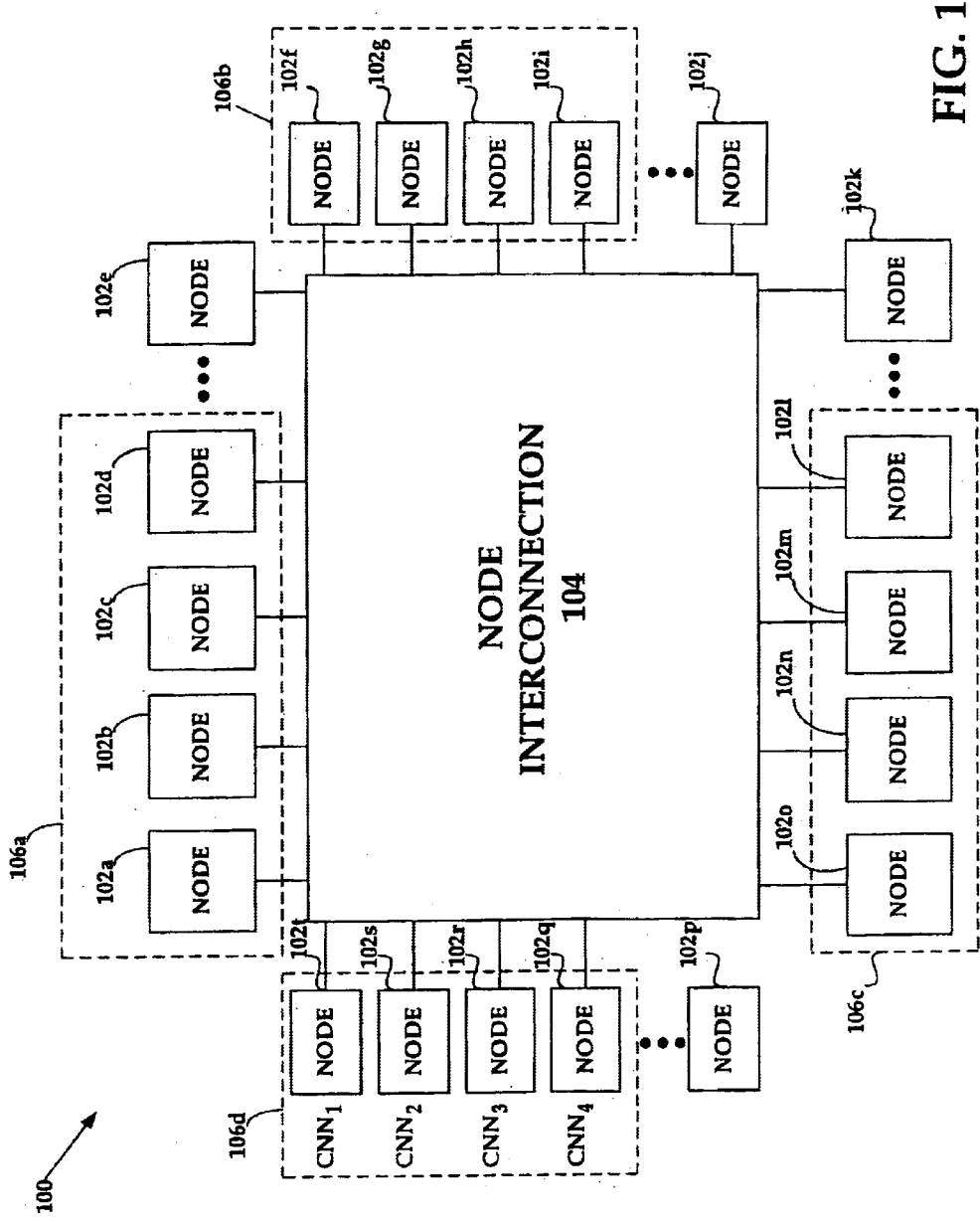
FIG. 1 is a block diagram of a computer system having multiple processor nodes according to the invention.

FIG. 1 is a block diagram of a multi-processor computer system 100, including a plurality of processor nodes 102a–t and a node interconnection 104, which provides point-to-point communication between the nodes 102. Each node 102 is identified by a unique node ID in interconnection 104 and may be configured as a stand-alone computer system, or, in combination with other processor nodes 102, may be configured to form a site 106. Each processor node 102, via interconnection 104, uses message-passing protocols to communicate with other nodes 102. In accordance with the invention, processor nodes 102, if they are in a site 106, use the same communication channel, i.e., interconnection 104, for both inter-processor node cache coherence and message passing protocols to increase the rate of message exchange. This is because the message passing protocol is tightly integrated with the cache coherence protocol. Consequently, the invention is advantageous over prior art that passes messages via an input/output channel and an interconnection. Further, FIG. 1 shows a point-to-point communication for illustrative purposes only; the invention is also usable in a broadcast communication interconnection.

Figure 2:
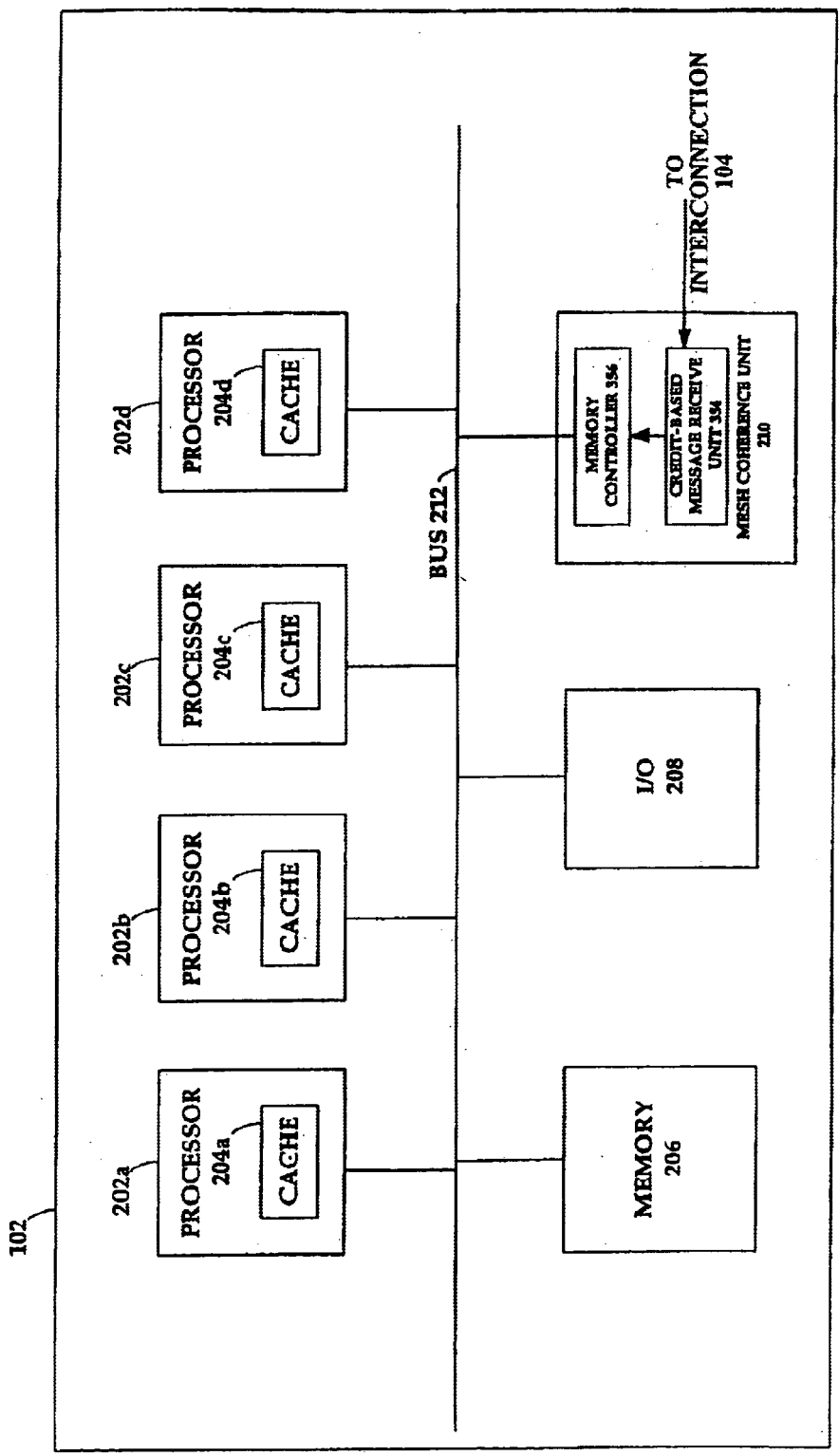
FIG. 2 shows an embodiment of a FIG. 1 processor node that includes a Mesh Coherence Unit embodying the invention.

FIG. 2 is a block diagram of an exemplary processor node 102 of FIG. 1, and includes a plurality of processors 202$a$–$d$, a memory subsystem 206, an input/output subsystem 208, and a mesh coherence unit (MCU) 210. Each processor 202$a$–$d$ has a respective cache 204$a$–$d$. Each of the functional units 202$a$–$d$, 206, 208, and 210 is connected to a processor bus 212 for transmitting control, address, and data signals. MCU 210, embodying the invention and connected to interconnection 104, coordinates cache coherence, message passages, and memory protection between processor nodes 102.

MCU 210 includes a credit-based message receive unit 354 comprising a buffer pool 301 (FIG. 3) and a control mechanism to pass messages that prevent a sending node 102 from excessively transmitting packets to, and swamping the memory of, a receiving node 102. Credit-based receive unit 354, via interconnect 104, receives messages from a sending node 102. In the preferred embodiment, a message is divided into a plurality of packets of 64 bytes each. Credit-based receive unit 354 stores the number of packets (or credits) that a sending node 102 can send to a receiving node 102. Buffer pool 301 holds messages received from a sending node 102. The control mechanism allocates a predetermined number of packets (or credits) that a receiving node 102 can receive from a sending node 102. When the sending node 102 sends more than the allocated number of packets, the extra packets will be discarded until the sending node 102 regains its credit or the system is reset. Because the packets are discarded without being written into buffer pool 301, buffer 301 can not overflow, and therefore the receiving node can continue to communicate with other nodes. Consequently, the invention is advantageous over prior art techniques that dedicate buffers for each sending node. Further, the invention requires fewer resources and is less expensive than those techniques.

In the preferred embodiment the invention uses a protocol like the Internet User Datagram Protocol (UDP), which does not guarantee communications because the protocol discards messages without notifying the sending node. However, the invention can be used in conjunction with, for example, a window-based protocol in which communication reliability is provided by a different layer of software. The software can check the sequence of packets to detect the loss of packets as long as the software uses a window-based protocol in a layer above the hardware. The invention can run various software on processors 202 to detect lost packets due to overflow. The invention can add additional hardware to generate interrupts, to log the information, or to set an overflow flag on a per-node basis when a message packet is discarded. The invention can add a counter or set of counters to account for the number of lost packets.

Memory controller 356 controls the passage of receiving packets from message receive unit 354 to memory 206.

Figure 3:
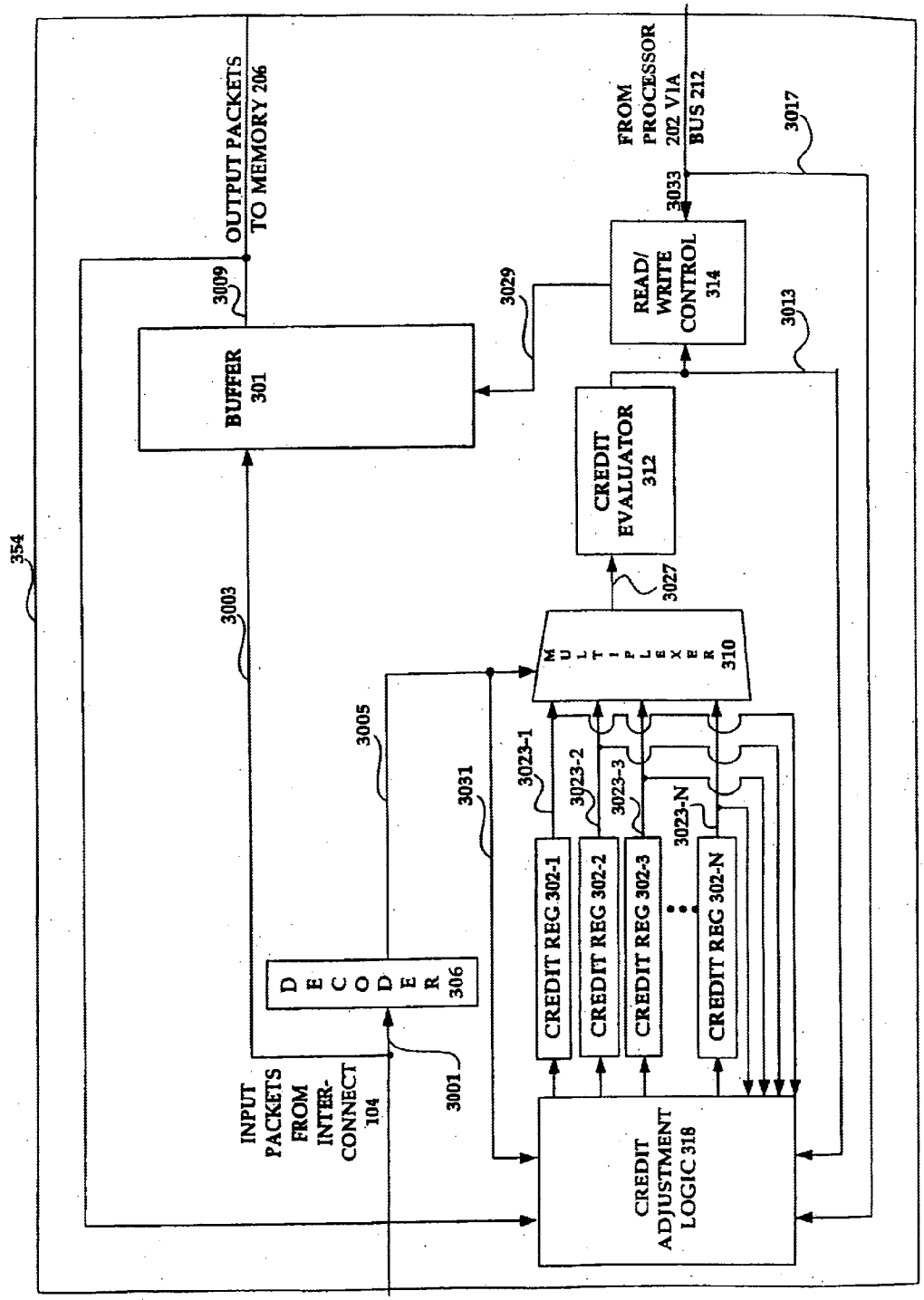
FIG. 3 is a block diagram of a credit-based message receive unit of FIG. 2.

FIG. 3 is a block diagram of a FIG. 2 credit-based message receive unit 354 that includes a buffer 301, a credit register bank 302 (302-1 through 302-N), a decoder 306, a multiplexer 310, a credit evaluator 312, read/write control logic 314, and credit ajustment logic 318. Buffer 301 receives input packets on line 3003 and provides output packets on line 3009 to memory 206. Buffer 301 is shared by all sending nodes 102, and in the preferred embodiment, comprises a first-in-first-out (FIFO) memory including a set of read/write pointers. When a packet is written into buffer 301 the write pointer is advanced by one. Similarly, when a packet is read from buffer 301, the read pointer is advanced by one. A packet on line 3003 is written into buffer 301 only if the sending node 102 has a positive "credit." If a sending node 102 has "zero" credit, the packet on line 3003 will not be written into buffer 301, and therefore is discarded. Signals on line 3029 control read and write operations of buffer 301, that is, they enable a packet on line 3003 to be written into, and later read from, buffer 301. Buffer 301, even though shown as part of receive unit 354, may be outside of receive unit 354.

Credit registers 302 store credit or the maximum number of packets a sending node 102 can send to a receiving node 102. Each register 302 is associated with a sending node 102. A system designer sets the maximum number of packets for each node such that buffer 301 will not overflow. Consequently, the maximum number of packets for each node relates to the size (Buffer Size) of buffer 301 as follows:

$$\text{Buffer Size} \geq \text{Packet Size} * \text{Credits per Node} * \text{Number of Nodes}$$

To avoid race conditions in updating a value in a credit register 302, adjustment logic 318 is not allowed to adjust the value in a credit register 302 during the time a processor 202 reads the value, adjusts the value, and writes the adjusted value to the credit register 302. Otherwise, the adjustment effect is lost. Thus, in the preferred embodiment, writing to a credit register 302 adds a write operand value to the current value of credit register 302 so that credit adjustment logic 318 can adjust (add or subtract) the credits without having to wait for an update to complete.

Decoder 306 receives input packet node IDs (of sending nodes 102) on line 3001 and decodes each node ID to provide a select signal on line 3005, which controls multiplexer 310 to select the appropriate one of credit data on lines 3023.

Multiplexer 310, based on a select signal on line 3005, passes the credit value on the selected line 3023 from the credit register 302 of the sending node 102 to line 3027.

Credit evaluator 312 determines whether a sending node 102 has credit, and thus should be allowed, to store its sending packet into buffer 301. Credit evaluator 312 preferably compares the credit value on line 3027 to a zero value to provide a signal on line 3013. If the value is greater than zero then the sending node 102 can temporarily store its packet into buffer 301; otherwise the packet will not be stored, and thus is discarded. The signal on line 3013 is then input to read/write control 314 and credit adjustment logic 318.

Read/write control logic 314, based on output signals on line 3013, generates a control signal on line 3029. If signals on line 3013 indicate that writing into buffer 301 is allowable, read/write control 314 preferably generates a "write enable (WE)" on line 3029 that permits writing the packet on line 3003 into buffer 301. Otherwise, read/write control 314 generates a signal on line 3029 to disable writing into buffer 301.

In generating the signal on line 3029, read/write control 314 also receives "re-credit" signals on line 3017 and 3033 from processor 202. A "re-credit" signal on line 3017 (and 3009) is applicable, for example, when a packet is read from buffer 301. In the embodiment where buffer 301 is part of memory 206, read/write controller 314 is preferably part of memory controller 356.

Credit adjustment logic 318 adjusts the contents of credit registers 302, i.e., increases or decreases the "credit" (or the number of packets) a sending node 102 can send to a receiving node 102. A credit is increased if a packet is read from buffer 301, and is decreased if a packet on line 3003 is written into buffer 301. Credit adjustment logic 318 functions based on input signals on lines 3009, 3013, 3017, 3023, and 3031. Signals on line 3009 provide credit adjustment logic 318 with the node ID of a sending node 102 that has a packet read from buffer 301. Alternatively, credit adjustment logic 318 can obtain the same node ID information via line 3031. A signal on line 3013 indicates whether a packet from a sending node 102 will be written into buffer 301, in which case the corresponding register credit should be decreased. A signal "re-credit" on line 3017 enables credit adjustment logic 318 to give a credit to a sending node 102, for example, when a packet is read from buffer 301 or when the system is reset. Signals on lines 3023-1 through 3023-N enable credit adjustment logic 318 to adjust the value in the credit register 302 that corresponds to a sending node 102.

Figure 4:
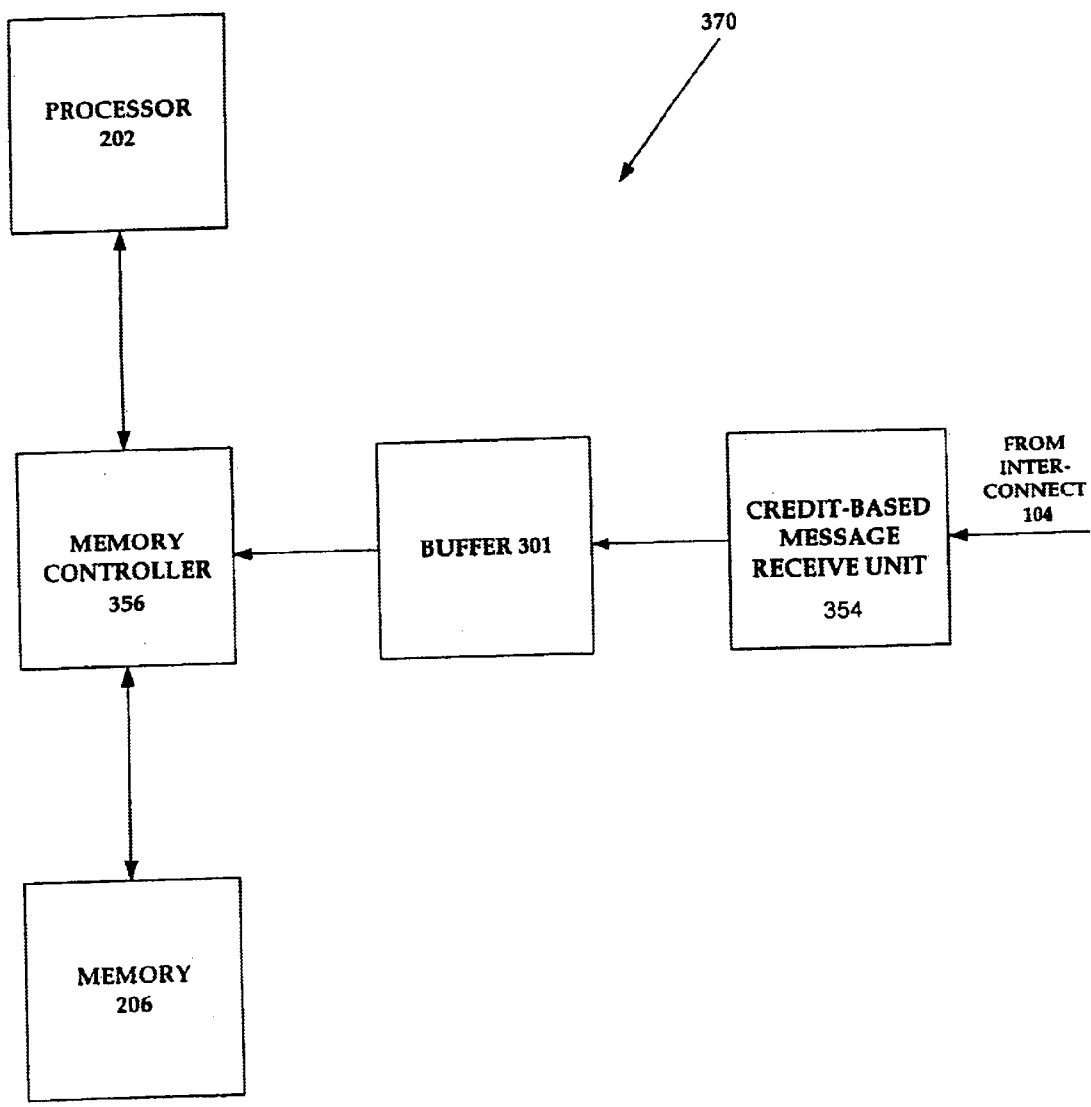
FIG. 4 shows a second embodiment of the invention.

FIG. 4 shows a second embodiment of the invention in a system 370 that includes a processor 202 a memory controller 356, a memory 206, a buffer 301, and a credit-based message receive unit 360. In this FIG. 4 embodiment, buffer 301 is outside of credit-based message receive unit 354 (FIG. 3). Consequently, credit-based message receive unit 360 is the same as credit-based message receive unit 354 without buffer 301. Functions of processor 202, memory controller 356, and memory 206 are the same as of those in FIG. 2. System 370 may constitute a node 102 and be connected to interconnect 104.

In a third embodiment of the invention, buffer 301 may be part of memory 206, and read/write controller 314 (FIG. 3) is thus preferably part of memory controller 356.

Figure 5:
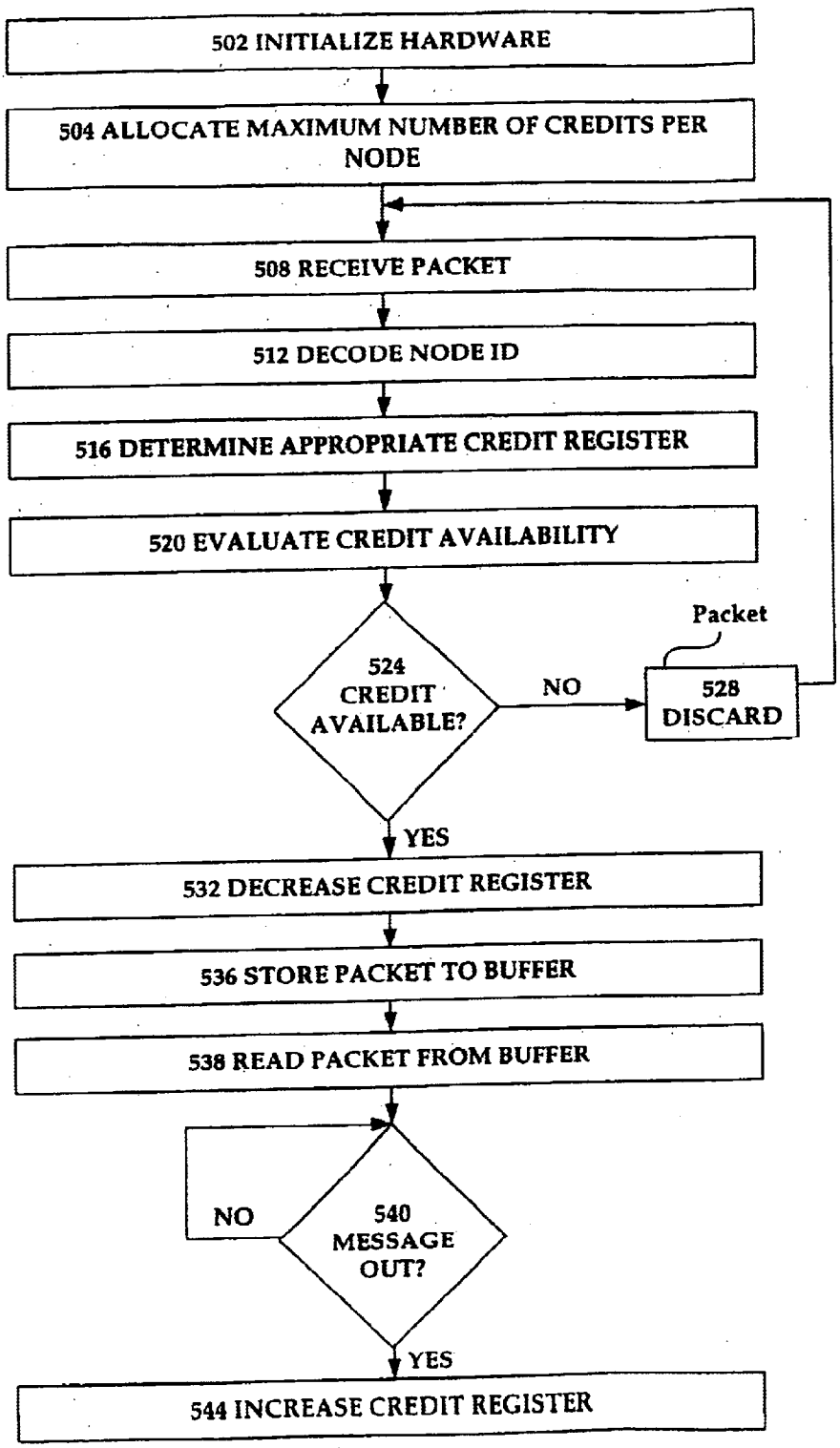
FIG. 5 is a flowchart illustrating a method for operating the invention.

FIG. 5 is a flowchart illustrating a method for operating a receive unit 354R of a receiving node 102R while receiving messages from a sending node 102S. The suffixes S and R indicate elements associated with the sending and receiving nodes 102S and 102R, respectively. In step 502 node 102R, via a processor 202R, initializes buffer 301R and credit registers 302R. In step 504 node 102R uses system designer inputs to allocate the maximum number of credits for each node 102S that can send messages to node 102R. As indicated above, the maximum number of credits per node 102S is related to the size (Buffer Size) of buffer 301R by the equation:

$$\text{Buffer Size} \geq \text{Packet Size} * \text{Credit per Node} * \text{Number of Nodes}$$

Node 102R assigns one credit register 302R for each node 102S. In step 508 receive unit 354R receives a packet "Packet-S" from node 102S. In step 512 decoder 306R decodes node ID-S and provides this node ID-S as a signal on line 3005 (FIG. 3). In step 516 multiplexer 310R uses this node ID-S to pass the appropriate credit value (Credit-S), which is provided by the credit register 302R corresponding to the sending node 102S. In step 520 credit evaluator 312R evaluates the credit availability of node 102S. If node 102S has zero credit, then credit evaluator 312R generates a signal to disable writing Packet-S to buffer 301R. Packet-S is thus implicitly discarded in step 528, and node 102R in step 508 waits to receive another Packet-S. However, if node 102S has a positive Credit-S, credit adjustment 318R in step 532 decreases this Credit-S, and read-write control 314R in step 536 enables writing of Packet-S into buffer 301R. Processor 202R can determine the arrival of Packet-S in buffer 301R either by periodically polling the write pointer of buffer 301R or the status of read/write control 314R, or by receiving an interrupt from receive unit 354R. If Packet-S has properly arrived, that is, it is stored in buffer 301R, then processor 202R in step 538 reads Packet-S from buffer 301R. In step 540 node 102R determines whether Packet-S has been read from buffer 301R. If so, node 102R, via credit adjustment 318R, increases the value in credit register 302S by 1.

The exemplary embodiments described herein are for purposes of illustration and not intended to be limiting. Therefore, those skilled in the art will recognize that other embodiments could be practiced without departing from the scope and spirit of the claims set forth below.

What is claimed is:

1. A message passing computer system, comprising:
   an interconnection;
   a plurality of multi-processor nodes connected to said interconnection; and
   a credit-based message receive unit coupled to said interconnection for controlling passage of messages through said multi-processor nodes, the message receive unit including a message buffer coupled to a plurality of credit registers;
   wherein the size of said buffer satisfies the condition:

$$\text{Buffer Size} \geq \text{Packet Size} * \text{Credit Per Node} * \text{Number of Nodes}.$$

2. The computer system of claim 1 wherein said buffer is constituted by a FIFO having a set of pointers for read/write access.

3. The computer system of claim 1 wherein each of said credit registers in a receiving node corresponds to a sending node.

4. The computer system of claim 3 wherein a value in said credit registers controls writing into said buffer.

5. The computer system of claim 4 wherein said value constitutes a maximum number of messages that the receiving node can receive from the sending node.

6. The computer system of claim 4, wherein the value represents the number of packets that can be written to a portion from a send node corresponding to the credit register.

7. The computer system of claim 4 wherein accessing messages in said buffer controls said value in said credit registers.

8. The computer system of claim 7 wherein said value is preset.

9. The computer system of claim 8 wherein each of said processor nodes comprises at least one processor end a memory.

10. The computer system of claim 9 wherein said buffer and said credit registers are part of a mesh coherence unit in each of said processor nodes.

11. The computer system of claim 1, wherein credit values associated with the credit-based message receive unit are only positive or zero.

12. The computer system of claim 1, wherein a send node cannot write to portions of the buffer allocated to other send nodes.

13. The computer system of claim 1 wherein said message receive unit comprises a multiplexer coupled to a decoder and to the plurality of credit registers.

14. A computer communication method in a multiprocessor node computer system, comprising the steps of:
  using a buffer for temporarily storing messages from at least one sending node to a receiving node;
  using credit values stored in credit registers, each credit value corresponding to a respective one of the at least one sending node and controlling writing incoming messages from the at least one sending node into said buffer; and
  determining the number of accesses of the at least one sending node to said buffer in order to adjust said credit value corresponding to the at least one sending node;
  wherein said credit value in each of said plurality of credit registers determines the maximum number of messages that a receiving node can receive from the corresponding sending node.

15. The method of claim 14 comprising the further step of using a sending node ID to select a credit register corresponding to the sending node.

16. The method of claim 14 comprising the further step of determining the arrival of a message by receiving an interrupt signal or by periodically polling pointer registers of said buffer.

17. The method of claim 14 comprising the further step of using the credit value of a sending node in determining whether to discard an incoming message from said sending node.

18. The method of claim 14, comprising the further step of, when a message is discarded because of a lack of credits, either generating an interrupt, or generating an overflow signal, or logging overflow information.

19. A system comprising:
  A) an interconnect;
  B) a plurality of multiprocessor nodes connected to the interconnect, including at least
    1) a bus,
    2) a plurality of processors having at least a cache connected to the bus,
    3) an input/output unit connected to the bus,
    4) a memory unit, and
    5) a mesh coherence unit connected to the bus, having at least
      a) a memory controller for controlling the memory unit, and
      b) a credit based receive unit having at least
        i) an input for receiving a packet from the interconnect,
        ii) a buffer coupled to the input for receiving,
        iii) a decoder, coupled to the input for receiving, for decoding an identification of the packet,
        iv) a credit adjustment logic unit coupled to the decoder and contents of the buffer, which, based on the decoding and the contents of the buffer creates a signal to adjust credit,
        v) a bank of credit registers having a credit register whose credit is adjusted based on the signal to adjust credit, for returning signals to the credit adjustment logic unit so that the credit register whose credit is adjusted corresponds to a sending unit,
        vi) a multiplexer coupled to the decoder and to the bank of credit registers for determining, based on the decoding, and passing, the credit value associated with the credit register whose credit is adjusted,
        vii) a credit evaluator for evaluating the credit value that was passed by comparing the credit value to a value corresponding to no credits left to determine if credits remain, and
        viii) a read/write control unit that is coupled to the buffer and to the credit evaluator and that uses results of the evaluating to determine whether to allow the packet to be written to the buffer;
    c) the credit adjustment logic unit being coupled to the read/write control unit to recredit credit registers depending on whether a packet is read, not read, written, or not written to the buffer.

20. A system comprising:
  a multiprocessor computer; and
  a message passing system within the multiprocessor computer for passing messages between processors of the multiprocessor computer, the message passing system including at least
    an interconnection,
    a plurality of multi-processor nodes connected to said interconnection, each multi-processor node having a multiple processors, and
    a credit-based message receive unit coupled to said interconnection for controlling passage of messages through said multi-processor nodes, the message receive unit including a message buffer coupled to a plurality of credit registers;
  wherein the size of said buffer satisfies the condition:

Buffer Size≧Packet Size*Credit Per Node*Number of Nodes.

* * * * *